United States Patent
Cox

[19]

[11] Patent Number: 5,953,327
[45] Date of Patent: Sep. 14, 1999

[54] CLASS OF LOW CROSS CORRELATION NON-PALINDROMIC SYNCHRONIZATION SEQUENCES FOR CODE TRACKING IN SYNCHRONOUS MULTIPLE ACCESS COMMUNICATION SYSTEMS

[75] Inventor: Timothy P. Cox, Palo Alto, Calif.

[73] Assignee: Stanford Telecommunications, Inc., Reston, Va.

[21] Appl. No.: 08/826,674

[22] Filed: Apr. 7, 1997

Related U.S. Application Data

[63] Continuation-in-part of application No. 08/739,319, Oct. 29, 1996, abandoned.

[51] Int. Cl.[6] .................................................... H04J 3/06
[52] U.S. Cl. ........................................... 370/336; 370/350
[58] Field of Search .................................... 370/319, 320, 370/324, 328, 335, 342, 350, 441, 479, 503, 336, 337, 345, 347; 375/200, 207, 208, 209, 210, 343, 354

[56] References Cited

U.S. PATENT DOCUMENTS

| | | | |
|---|---|---|---|
| 5,402,450 | 3/1995 | Lennen | 375/343 |
| 5,623,485 | 4/1997 | Bi | 370/209 |
| 5,623,487 | 4/1997 | Natali | 370/342 |
| 5,638,361 | 6/1997 | Ohlson et al. | 370/342 |
| 5,638,362 | 6/1997 | Dohi et al. | 370/342 |

*Primary Examiner*—Chi H. Pham
*Assistant Examiner*—Kwang B. Yao
*Attorney, Agent, or Firm*—Jim Zegeer

[57] ABSTRACT

A method and apparatus are provided which enables all return links from the remote stations in a star configured CDMA system to be maintained in time synchronization. This method employs special synchronization codes in conjunction with a standard CDMA chip time tracking apparatus, such as a Delay Lock Loop. Each of these special synchronization codes possesses an extremely low cross-correlation property with each of the other codes in the set of synchronization codes. The low cross-correlation property exists for time offsets up to plus and minus one CDMA chip period which permits the use of a standard chip timing discriminator apparatus, such as an early-late gate, within the Delay Lock Loop. Given the extremely low cross-correlation of these special synchronization codes, a significant improvement is achieved in time tracking performance and/or return link signal efficiency over prior art.

3 Claims, 3 Drawing Sheets

—·—·— FORWARD LINK —·—·—>

———— RETURN LINK ————>

Timing error

CLASS OF LOW CROSS CORRELATION NON-PALINDROMIC SYNCHRONIZATION SEQUENCES FOR CODE TRACKING IN SYNCHRONOUS MULTIPLE ACCESS COMMUNICATION SYSTEMS

REFERENCE TO RELATED APPLICATIONS

This application is a continuation-in-part of application Ser. No. 08/739,319 filed Oct. 29, 1996 now abandoned, entitled CODE TRACKING IN SYNCHRONOUS MULTIPLE ACCESS COMMUNICATION SYSTEMS.

This application is related to application Ser. No. 08/739,317 filed Oct. 29, 1996 (now abandoned) entitled A DELAY-LOCK LOOP FOR TIME TRACKING IN SYNCHRONOUS MULTIPLE ACCESS COMMUNICATION SYSTEMS; Ser. No. 08/813,091 filed Mar. 7, 1997 entitled A CLASS OF LOW CROSS CORRELATION PALINDROMIC SYNCHRONIZATION SEQUENCES FOR TIME TRACKING IN SYNCHRONOUS MULTIPLE ACCESS COMMUNICATION SYSTEMS; and application Ser. No. 08/444,749 filed May 19, 1995, now U.S. Pat. No. 5,623,487, entitled DOUBLY ORTHOGONAL CODE AND FREQUENCY DIVISION MULTIPLE ACCESS COMMUNICATION SYSTEM, incorporated herein by reference.

BACKGROUND AND BRIEF DESCRIPTION OF THE INVENTION

The star architecture of the multiple access communications system consists of a hub station in the center of the star and remote stations of which there is one each at the points of the star. It is assumed that a communications path exists by which the hub station transmits information to each of the remote stations and this path is called the Forward Link. It is assumed that a communications path exists by which an individual remote station transmits information to the hub station and this path is called the Return Link. A star architecture with K remote stations is shown in FIG. 1.

The object of this invention is to provide a method for synchronizing the code sequences of subscribers in a Doubly Orthogonal Code and Frequency Division Multiple Access (DOCDMA) communications system.

This invention is applicable to a DOCDMA communications system which is configured in a star architecture. The DOCDMA system is described in U.S. patent application Ser. No. 444,749, filed May 19, 1995, entitled DOUBLY ORTHOGONAL CODE AND FREQUENCY DIVISION MULTIPLE ACCESS COMMUNICATION SYSTEM, also incorporated herein by reference. In this system, multiple OCDMA signals are transmitted on orthogonally spaced carriers such that a single remote station transmits on a single orthogonal function on a single carrier frequency. FIG. 2 illustrates the composite frequency spectrum for DOCDMA signals. It is necessary in this application that all Return Link signals received at the hub station are time synchronous. The signals possess the same Time Division Multiplex structure in which a portion of the signal is dedicated to a time synchronization burst. This invention specifies that synchronization burst sequence (Sync Code) for each individual signal, and provides a code tracking delay-lock loop for achieving accurate timing of each individual signal.

The novelty of this invention is the use of special Sync Code sequences in the otherwise well known Time-Gated Delay Lock Loop (Spilker,J. J.,"Digital Communications by Satellite," Englewood Cliffs, N.J. 1977, Prentice-Hall, pp 555–569). These Sync Codes are specified so that the interference between Return Link signals which are coincident in time and frequency is minimized, which means that the code tracking and synchronization process for each signal is relatively unaffected by others. In a DOCDMA communications system, the subscribers on odd carriers ($f_1$, $f_3$, $f_5$ ...) are assigned one-half the total set of Sync Codes available, and the subscribers on even carriers ($f_2$, $f_4$, $f_6$ ...) are assigned the other half. To implement the code tracking loop, a portion of the Forward Link information capacity is allocated to the signal timing error data which the remote station uses for timing correction. It is assumed that each remote station receives its own timing error data in a robust, uncorrupted manner. A portion of the Return Link information capacity is allocated to the Sync Code which is received by the hub station and processed by the Delay Discriminator. This code tracking loop as described is shown in FIG. 3.

The Sync Codes are specified in sets and possess special properties which provide the desirable characteristics of minimal interference when all of the codes are nearly coincident. The Sync Codes are constructed using a basis sequence of length N, $b_0, b_1, \ldots, b_{n-1}$, with each element in the basis sequence drawn from a binary alphabet $\{-1, +1\}$. This basic sequence has a two valued circular auto-correlation function, which is given as $$C(\tau) = \sum_{n=0}^{N-1} b_n b_{(n+\tau)\bmod(N)} = \begin{cases} N \text{ for } \tau = 0 \\ -1 \text{ for } \tau = 1, 2, N-1. \end{cases}$$

The Sync Code sequences are constructed as follows.

1) The number of symbols in a Sync Code sequence is N+5.

2) Denoting the symbols of the $k^{th}$ Sync Code sequence as $a_o(k), a_1(k), a_2(k), \ldots, a_{N+4}(k)$, then the first 3 symbols are fixed such that $a_o(k)=+1$, $a_1(k)+1$, and $a_2(k)=+1$.

3) The fourth symbol of the Sync Code is the same as the symbol previous to the last such that $a_3(k)=a_{N+3}(k)$, where $a_{N+3}(k)$ is determined in Step 4.

4) The next N symbols of the Sync Code, $a_4(k), a_5(k), \ldots, a_{N+3}(k)$, are obtained from a circular shift of the basis sequence such that $a_i(k)=b_{(i+J(k))\bmod(N)}$ for $i=4, 5, \ldots, N+3$ and for a given J(k), $0 \leq J(k) \leq N-1$. The set J consists of the circular shift indices for the K remote stations. The definition of the values in the set J is crucial to the functionality of this invention. To a large degree it is the proper selection of the circular shift indices that provides for minimal interference between the Return Link Sync Codes. Since the use of a Sync Code sequence is in conjunction with a Delay Discriminator, the operational limitations of the discriminator will dictate the design. As will be described next, this limitation leads to the following rule for selecting the circular shift indices in J.

Rule: The set J consisting of the circular shift indices is divided into 2 subsets $J_{odd}$ and $J_{even}$ corresponding to the odd numbered carriers and even numbered carriers, respectively. The minimum difference between all pairs of indices in either subset must be greater than one, that is:

$$|J_{even}(m) - J_{even}(n)| > 1$$

for all $m, n = 0, 1, 2, \ldots, K-1$ and $m \neq n$

-continued $$|J_{odd}(m) - J_{odd}(n)| > 1$$

for all $m, n = 0, 1, 2, \ldots, K - 1$ and $m \neq n$ $$|J_{even}(m) - J_{even}(n)| > 1$$

for all $m, n = 0, 1, 2, \ldots, K - 1$.

5) The last symbol of the Sync Code is the same as the fifth symbol such that $a_{N+4}(k)=a_4(k)$ where $a_4(k)$ is determined in Step 4.

There are several types of binary sequences that may be used as the basis sequence, which have the preferred two valued auto-correlation function. If N+1 is a power of 2, then one of the most obvious choices is the m-sequence or maximal length shift register sequence (Golomb, Solomon W., "Shift Register Sequences, Revised Edition," Laguna Hills, Calif., 1982, AEGEAN PARK PRESS). In the event that N+1 is not a power of 2, then an m-sequence cannot be used as a basis sequence without modification. Other sequences which have the preferred two valued auto-correlation function but do not in general have length of the form $2^n-1$ can be used as basis sequences. Such sequences include Legendre (Quadratic Residue) sequences and Twin Prime sequences, for example. Since the number of Sync Codes required by a multiple access communications system may be less than the number of elements in J, then any subset of J can be used.

DESCRIPTION OF THE DRAWINGS

The above and other objects, advantages and features of the invention will become more apparent when considered with the following specification and accompanying drawings, wherein.

DETAILED DESCRIPTION OF THE INVENTION

The invention is incorporated in a doubly orthogonal code division multiple access (DOCDMA) multiple access communication system in which return link paths from the remote stations to the hub are time synchronous.

Figure 1:
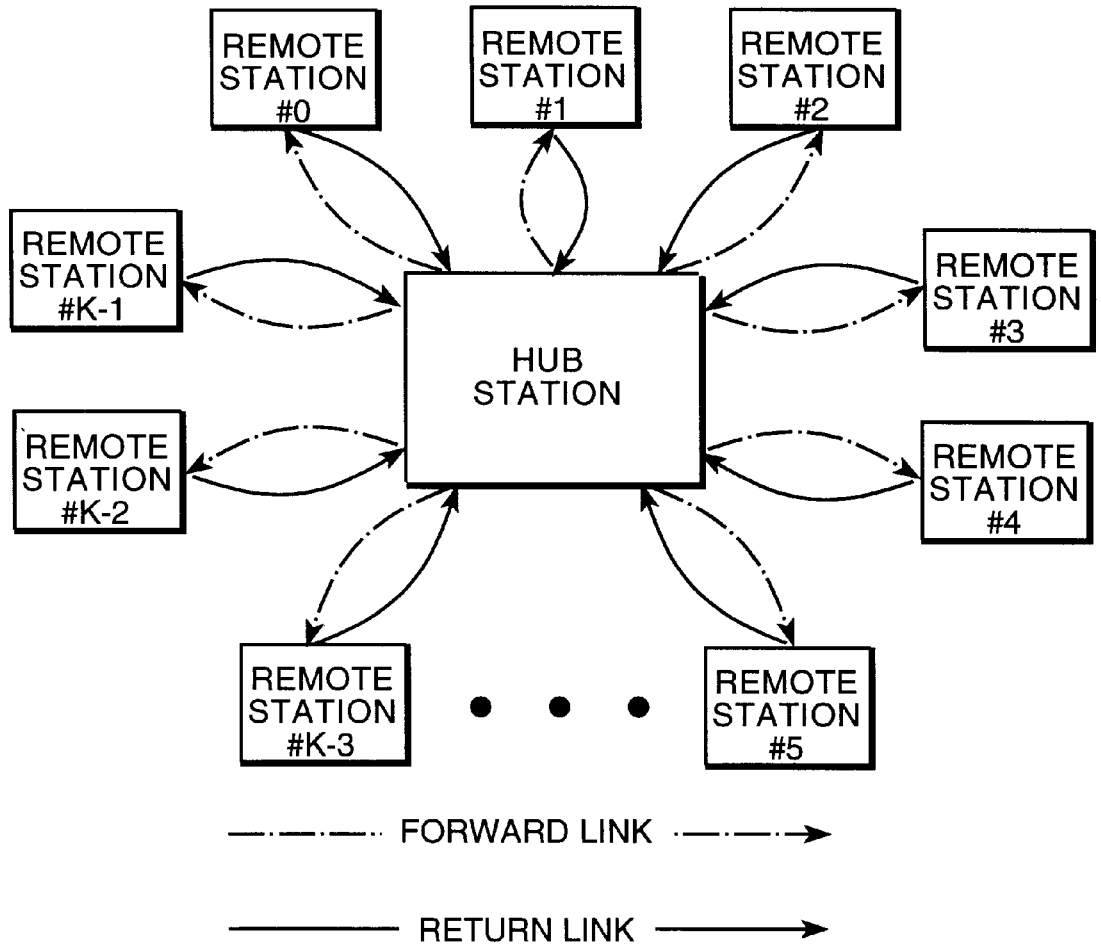
FIG. 1 is a block diagram of a multiple access communications system which is configured in a star architecture, incorporating the invention.
Figure 2:
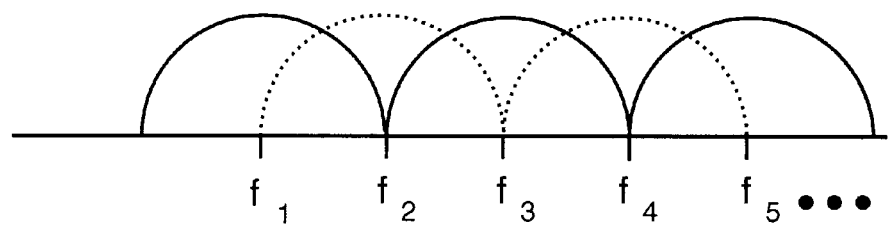
FIG. 2 illustrates the composite frequency spectrum for DOCDMA signals incorporating the invention.
Figure 3:
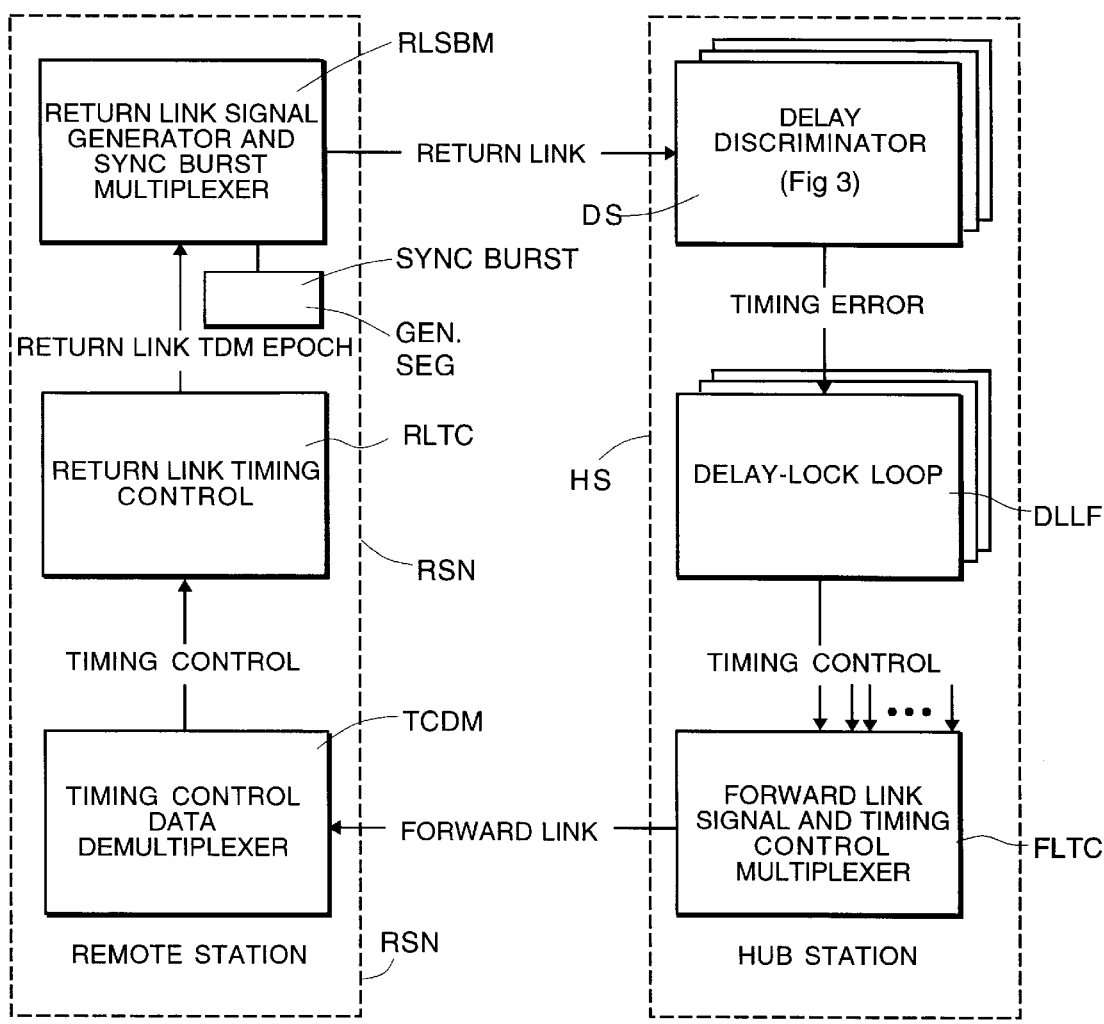
FIG. 3 is a block diagram of the return link time tracking delay-lock loop with processing element allocated to remote and hub stations, incorporating the invention.

As noted above, the novelty of this invention is the use of special Sync Code sequences in the otherwise well known Time-Gated Delay Lock Loop. These Sync Codes are specified so that the interference between Return Link signals which are coincident in time and frequency is minimized, which means that the code tracking and synchronization process for each signal is relatively unaffected by others. In a DOCDMA communications system, the subscribers on odd carriers ($f_1, f_3, f_5$...) are assigned one-half the total set of Sync Codes available, and the subscribers on even carriers ($f_2, f_4, f_6$...) are assigned the other half. To implement the code tracking loop, a portion of the Forward Link information capacity is allocated to the signal timing error data which the remote station uses for timing correction. It is assumed that each remote station receives its own timing error data in a robust, uncorrupted manner. A portion of the Return Link information capacity is allocated to the Sync Code which is received by the hub station and processed by the Delay Discriminator. This code tracking loop as described is shown in FIG. 3.

The Sync Codes are specified in sets and possess special properties which provide the desirable characteristics of minimal interference when all of the codes are nearly coincident. The Sync Codes are constructed using a basis sequence of length N, $b_0, b_1, \ldots, b_{N-1}$, with each element in the basis sequence drawn from a binary alphabet $\{-1, +1\}$. This basic sequence has a two valued circular auto-correlation function, which is given as:

$$C(\tau) = \sum_{n=0}^{N-1} b_n b_{(n+\tau) \bmod(N)} = \begin{cases} N \text{ for } \tau = 0 \\ -1 \text{ for } \tau = 1, 2, N-1 \end{cases}$$

N is defined as the length of the basis sequence which is a parameter that is chosen by the system designer to either provide enough codes or to provide enough energy in the tracking process.

The Sync Code sequences are constructed as follows.

1) The number of symbols in a Sync Code sequence is N+5.

2) Denoting the symbols of the $k^{th}$ Sync Code sequence as $a_0(k), a_1(k), a_2(k), \ldots, a_{N+4}(k)$, then the first 3 symbols are fixed such that $a_0(k)=+1$, $a_1(k)=+1$, and $a_2(k)=+1$.

3) The fourth symbol of the Sync Code is the same as the symbol previous to the last such that $a_3(k)=a_{N+3}(k)$, where $a_{N+3}(k)$ is determined in Step 4.

4) The next N symbols of the Sync Code, $a_4(k), a_5(k), \ldots, a_{N+3}(k)$, are obtained from a circular shift of the basis sequence such that $a_i(k)=b_{(i+J(k)) \bmod(N)}$ for $i=4, 5, \ldots, N+3$ and for a given $J(k)$, $0 \leq J(k) \leq N-1$. The set J consists of the circular shift indices for the K remote stations. The definition of the values in the set J is crucial to the functionality of this invention. To a large degree it is the proper selection of the circular shift indices that provides for minimal interference between the Return Link Sync Codes. Since the use of a Sync Code sequence is in conjunction with a Delay Discriminator, the operational limitations of the discriminator will dictate the design. As will be described next, this limitation leads to the following rule for selecting the circular shift indices in J.

Rule: The set J consisting of the circular shift indices is divided into 2 subsets $J_{odd}$ and $J_{even}$ corresponding to the odd numbered carriers and even numbered carriers, respectively. The minimum difference between all pairs of indices in either subset must be greater than one, that is:

$$|J_{even}(m) - J_{even}(n)| > 1$$

for all $m, n = 0, 1, 2, \ldots, K - 1$ and $m \neq n$

-continued $|J_{odd}(m) - J_{odd}(n)| > 1$ for all $m, n = 0, 1, 2, \ldots, K-1$ and $m \neq n$ $|J_{even}(m) - J_{even}(n)| > 1$ for all $m, n = 0, 1, 2, \ldots, K-1$.

5) The last symbol of the Sync Code is the same as the fifth symbol such that $a_{N+4}(k)=a_4(k)$, where $a_4(k)$ is determined in Step 4.

There are several types of binary sequences that may be used as the basis sequence, which have the preferred two valued auto-correlation function. If N+1 is a power of 2, then one of the most obvious choices is the m-sequence or maximal length shift register sequence (Golomb, Solomon W., "Shift Register Sequences, Revised Edition," Laguna Hills, Calif., 1982, AEGEAN PARK PRESS). In the event that N+1 is not a power of 2, then an m-sequence cannot be used as a basis sequence without modification. Other sequences which have the preferred two valued auto-correlation function but do not in general have length of the form $2^n-1$ can be used as basis sequences. Such sequences include Legendre (Quadratic Residue) sequences and Twin Prime sequences, for example. Since the number of Sync Codes required by a multiple access communications system may be less than the number of elements in J, then any subset of J can be used.

Figure 6:
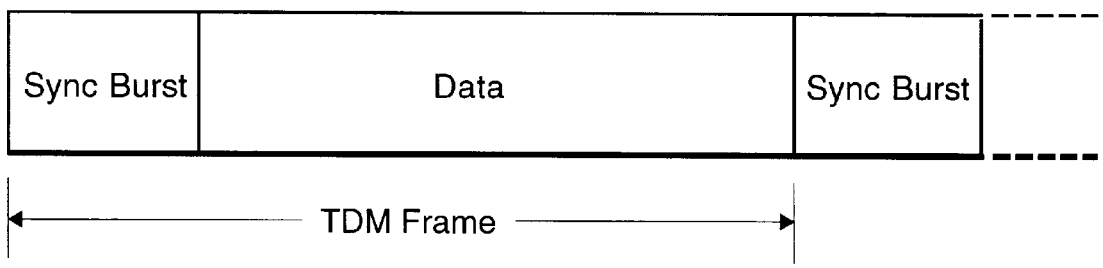
FIG. 6 illustrates the time division multiplexed waveform with sync burst multiplexed with the user terminal data signal.

As shown in FIG. 3, the remote station RS receives forward link signals from the hub station HS which are downconverted, processed and applied to a timing control data demultiplexer TCDM which outputs the timing control signal to return link timing control unit RLTC. Return link timing control RLTC outputs the return link time division multiplex (TDM) epoch to the return link signal generator and sync burst multiplexer RLSBM. The sync burst generator SBG generates unique sync bursts (shown in FIG. 6 in relation to a time division multiplexed waveform showing the sync burst multiplexed with the user terminal data signal) having special properties which provide the desirable characteristics of minimal mutual interference when the sync burst of all remote stations are nearly coincident and, preferably have the qualities specified above in the section entitled "Sync Burst".

The broadcast return link signals from each of the remote stations are received at the hub station HS and processed to delay discriminators DS there being a delay discriminator for each remote station, respectively. The timing error signal is filtered in delay lock loop filter DLLF, each of which outputs a timing control signal. The timing control signals from the respective delay lock loop filters are multiplexed in forward link signal and timing control multiplex FLTCM and outputted on the forward link to all remote stations where they are received and processed as described earlier.

Figure 4:
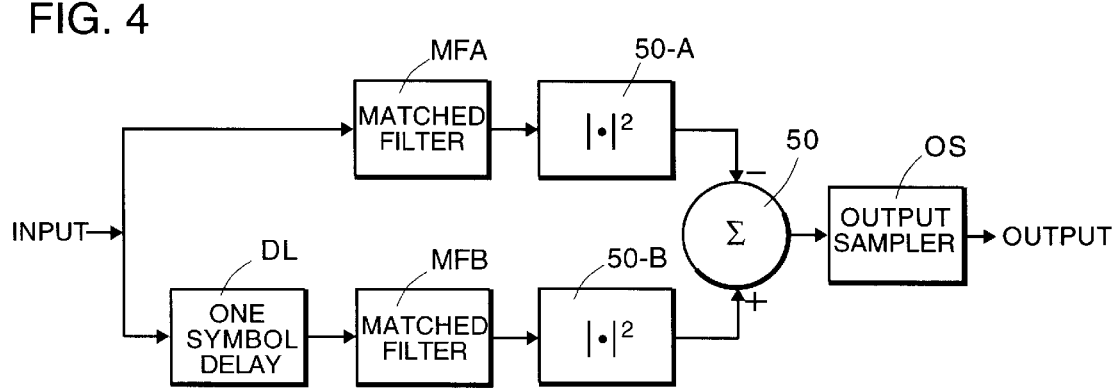
FIG. 4 is a block diagram of the delay discriminator.

The novel features of the present invention can be seen most readily by describing the Delay Discriminator process. This consists of a delay element DL, two matched filters MFA, MFB, two squaring operators SO-A and SO-B, a summation operator SO and an output sampler PS. A block diagram of a Delay Discriminator is shown in FIG. 4 as indicated in FIG. 3. The Delay Discriminator process is duplicated for each remote station in the star architecture, but the coefficients of the digital matched filters are distinct for each remote station since these coefficient values are based on the Sync Code sequence associated with that remote station. The Matched Filter (MF) coefficients for the $k^{th}$ remote station are constructed from its Sync Code as follows. 1) The coefficients comprise a sequence of length N+5).

1) Denoting the symbols in the MF sequence as $m_0(k)$, $m_1(k), m_2(k), \ldots, m_{N+4}(k)$, then the first 4 symbols are fixed such that $m_0(k)=0$, $m_1(k)=+1$, $m_2(k)=0$, and $m_3(k)=0$.

2) The next N symbols of the MF sequence are determined by the Sync Code such that $m_i(k)=a_i(k)$ for $i=4, 5, \ldots, N+3$.

3) The last symbol of the MF sequence is fixed such that $m_{N+4}(k)=0$.

Figure 5:
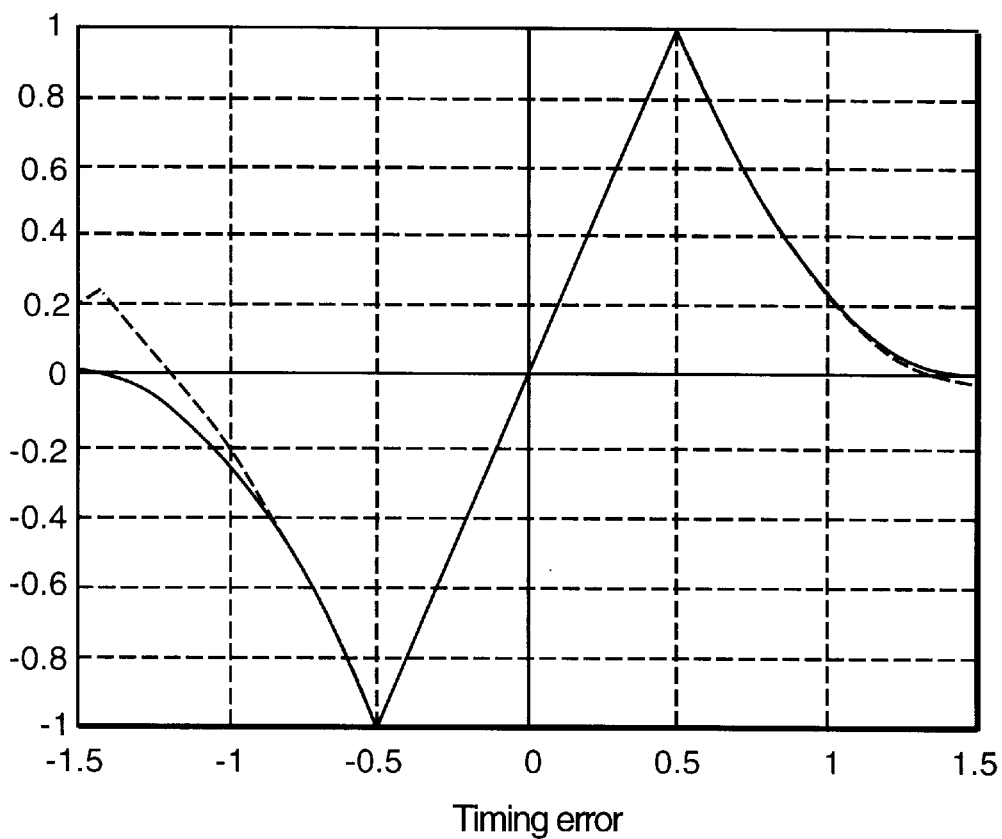
FIG. 5 is a graph illustrating the timing error signal at the output of the delay discriminator shown in FIG. 1.

The Output Sampler shown in FIG. 4 samples the incoming signal at an offset of half a symbol period with respect to the peak of the first Matched Filter output. The Timing Error signal at the output of the discriminator as a function of the Return Link timing offset for a simple example with K=3 remote stations is shown in FIG. 5. The solid line represents the Delay Discriminator output with no interference present, and the dashed line shows the degradation in output due to interference from two other remote stations.

What is claimed is:

1. In a star configured multiple access radio communication system wherein a hub station communicates, in time division multiplex mode, with a plurality of remote subscriber stations by means of a forward link signal path and the remote subscriber stations communicate with the hub on a return link that has multiple RF carriers that are configured in an orthogonal manner and wherein all received return link signals are time synchronous, and all signals possess the same time division multiplex structure in which a portion of the signal is dedicated to time synchronization, the system comprising:

at each remote subscriber station, a synchronization burst sequence generator, each burst sequence generator assuming that the time tracking and synchronization process of each return link is relatively unaffected by all other remote stations, said synchronization burst sequence including Sync Codes, said Sync Codes are constructed using a basis sequence of length N, $b_0, b_1, \ldots, b_{N-1}$, with each element in the basis sequence drawn from a binary alphabet $\{-1, +1\}$, said basic sequence having a two valued circular auto-correlation function, which is given as:

$$C(\tau) = \sum_{n=0}^{N-1} b_n b_{(n+\tau) \bmod(N)} = \begin{cases} N \text{ for } \tau = 0 \\ -1 \text{ for } \tau = 1, 2, N = 1 \end{cases}$$

where N=a whole number.

and at said hub station a delay discriminator for each remote subscriber, each said delay discriminator including a first and a second channel, said first channel having a one symbol delay means, a first matched filter, and a squaring circuit, said second channel having a matched filter and a squaring circuit, means summing the outputs of said squaring circuits, and an output sampler for sampling the incoming signals at an offset of half a symbol period with respect to the peak of said first matched filter.

2. The invention defined in claim 1 wherein said Sync Codes are constructed as follows:
  1) the number of symbols in a Sync Code sequence is N+5,
  2) denoting the symbols of the $k^{th}$ Sync Code sequence as $a_0(k), a_1(k), a_2(k), \ldots, a_{N+4}(k)$, then the first 3 symbols are fixed such that $a_0(k)=+1$, $a_1(k)=+1$, and $a_2(k)=+1$,
  3) the fourth symbol of the Sync Code is the same as the symbol previous to the last such that $a_3(k)=a_{N+3}(k)$, where $a_{N+3}(k)$ is determined in Step 4,
  4) the next N symbols of the Sync Code, $a_4(k), a_5(k), \ldots, a_{N+3}(k)$, are obtained from a circular shift of the basis sequence such that $a_i(k)=b_{(i+J(k)) mod(N)}$ for $i=4, 5, \ldots, N+3$ and for a given $J(k)$, $0 \leq J(k) \leq N-1$; the set J consists of the circular shift indices for the K remote stations; the definition of the values in the set J is crucial to the functionality of this invention; to a large degree it is the proper selection of the circular shift indices that provides for minimal interference between the Return Link Sync Codes; since the use of a Sync Code sequence is in conjunction with a Delay Discriminator, the operational limitations of the discriminator will dictate the design of Sync Code sequence; it leads to the following rule for selecting the circular shift indices in J;
  Rule: the set J consisting of the circular shift indices is divided into 2 subsets $J_{odd}$ and $J_{even}$ corresponding to the odd numbered carriers and even numbered carriers, respectively; the minimum difference between all pairs of indices in either subset must be greater than one, that is:

$$|J_{even}(m) - J_{even}(n)| > 1$$

for all $m, n = 0, 1, 2, \ldots, K-1$ and $m \neq n$ $$|J_{odd}(m) - J_{odd}(n)| > 1$$

for all $m, n = 0, 1, 2, \ldots, K-1$ and $m \neq n$ $$|J_{even}(m) - J_{even}(n)| > 1$$

for all $m, n = 0, 1, 2, \ldots, K-1$ where K is the number of remote subscriber stations,
  5) the last symbol of the Sync Code is the same as the fifth symbol such that $a_{N+4}(k)=a_4(k)$, where $a_4(k)$ is determined in Step 4.

3. In a star configured multiple access radio communication system wherein a hub station communicates, in time division multiplex mode, with a plurality of remote subscriber stations by means of a forward link signal path and the remote subscriber stations communicate with the hub on a return link that has multiple RF carriers that are orthogonally configured and wherein all received return link signals are time synchronous, and all signals possess the substantially same time division multiplex structure in which a portion of the signal is dedicated to time synchronization, the system comprising:
  at each remote subscriber station, a synchronization burst sequence generator, said synchronization burst sequence including Sync Codes, said Sync Codes are constructed using a basis sequence, said basis sequence being non-palindromic and having a two valued circular auto-correlation function,
  said hub station having a delay discriminator for each remote subscriber, each said delay discriminator including a first and a second channel,
    said first channel having a one symbol delay means, a first matched filter, and a squaring circuit, said second channel having a matched filter and a squaring circuit,
    means summing the outputs of said squaring circuits, and
  an output sampler for sampling the incoming signals at an offset of half a symbol period with respect to the peak of said first matched filter.

\* \* \* \* \*

UNITED STATES PATENT AND TRADEMARK OFFICE
CERTIFICATE OF CORRECTION

PATENT NO. : 5,953,327
DATED : September 14, 1999
INVENTOR(S) : Timothy F. Cox

It is certified that error appears in the above-indentified patent and that said Letters Patent is hereby corrected as shown below:

On the cover sheet, the inventor's name is corrected to read: "TIMOTHY F. COX"

Signed and Sealed this

Eighteenth Day of April, 2000

*Attest:*

Q. TODD DICKINSON

*Attesting Officer*  *Director of Patents and Trademarks*